Nov. 16, 1937.　　　　C. H. MANEVAL　　　　2,099,656
COASTER SLED
Filed Jan. 16, 1937
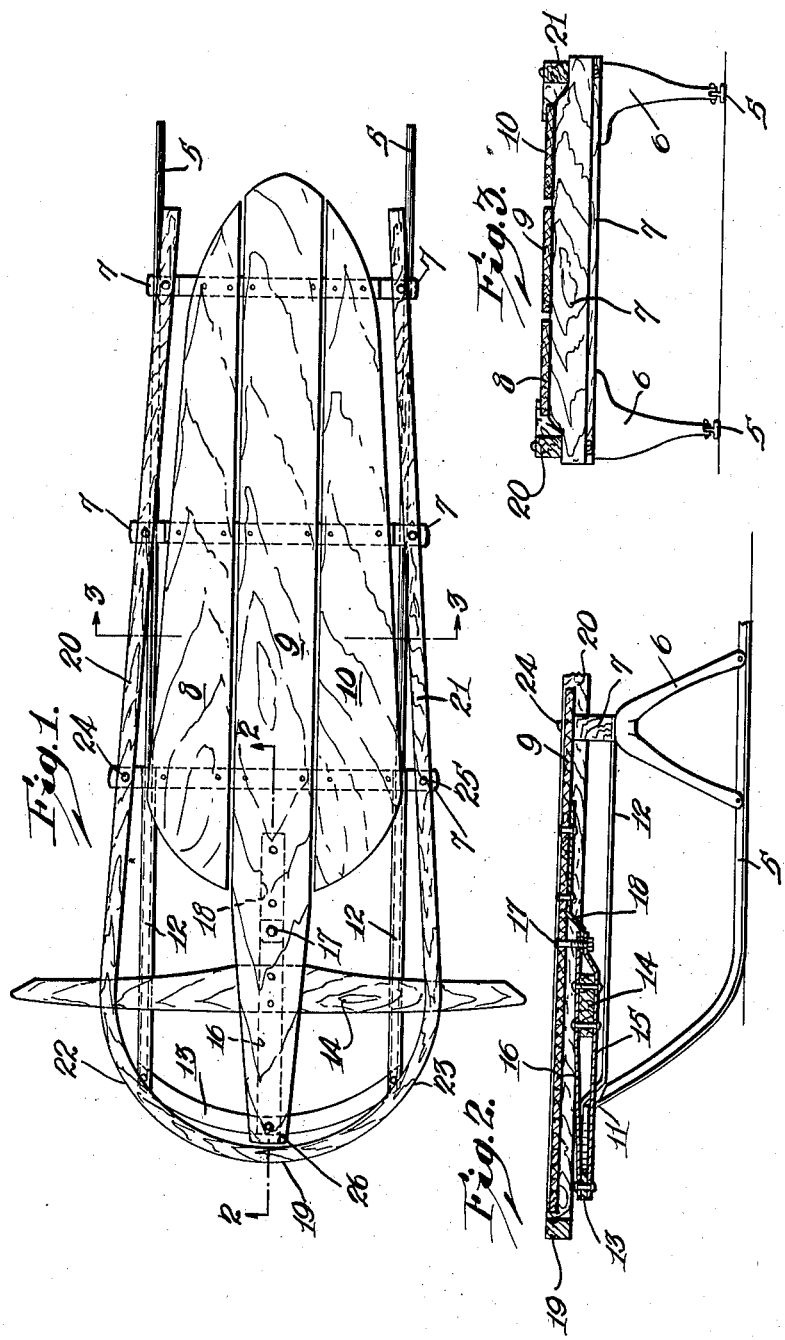
Inventor
Charles Herbert Maneval Patented Nov. 16, 1937

2,099,656

UNITED STATES PATENT OFFICE 2,099,656

COASTER SLED

Charles Herbert Maneval, Duncannon, Pa., assignor to Standard Novelty Works, Duncannon, Pa., a corporation of Pennsylvania Application January 16, 1937, Serial No. 120,890

4 Claims. (Cl. 280—22)

My invention relates to hand sleds.

A purpose of my invention is to improve the strength and rigidity of a wooden sled frame and reduce the cost of sled manufacture.

A further purpose is to form the side fenders and front fender (bumper) of the sled as one continuous bent wooden fender strip.

A further purpose is to provide a fender for the front of the sled with resilient side support and resilience longitudinally of the sled in connection with a stop by which collapse of the front fender is prevented.

Further purposes will appear in the specification and in the claims.

The invention has been illustrated in connection with a stream-lined hand sled having steering mechanism and runners independent of the bumper.

Figure 1 is a top plan view of the preferred form of the invention.

Figure 2 is a section taken upon line 2—2 of Figure 1, looking in the direction of the arrows.

Figure 3 is a section of Figure 2 taken upon line 3—3 of Figure 1, looking in the direction of the arrows.

In the specification, similar numerals indicate like parts.

During long continued manufacture of hand sleds, particularly the so-called coasting sleds, steel has proved to be poorly suited for the frames of the sleds not only because of the additional expense and undue weight of the metal but because it is so cold to the touch as to be objectionable to the rider.

This has confied the manufacture to wooden framed sleds. These wooden frames have been very satisfactory in most respects but with the desirability of providing a front fender for the sled have required in the past that the front fender be joined to the front ends of the side fenders of the frame. The joint at this point has complicated matters in manufacture, has added to the cost of manufacture as well as to the cost of assemblage and has made the front fender a mere front piece without organizing it as part of the sled frame.

The present invention is intended to overcome these objections and to change the front fender —from the standpoint of the sled frame—from a liability to an asset.

In the illustration the construction has been shown in a sled in which steering is effected by lateral flexing of the runners. As there shown the sled is provided with the usual runners 5, knees 6, benches 7 and top boards 8, 9, and 10.

The ends 11 of the runners are connected with the front bench by preferably steel side rails 12 and are themselves joined one to the other by a metal head iron 13 through which steering is effected.

The steering bar 14 passes between and is rigidly connected to two straps 15, 16 which together form the steering lever. They are pivotally connected at the front ends to the head iron 13 and at the rear ends are pivoted by pin 17 to the top board 9. The lower end of the pin passes through the straps and through a bracket 18 which is itself secured to the top board.

The steering mechanism is separate and distinct from the frame of the sled except as pivotal connection is made to the top board.

The wooden fender 19 is curved and is integral with the side fenders 20 and 21, the front fender thus forming the center of a continuous wooden strip which is bent to form the curved contour of the front fender and whose terminals form the side fenders which are attached to the benches 7. This not only reduces the cost of manufacture of the continuous fender, considered as elements of the sled, but very much reduces the cost of assemblage of the combined unit and improves the operation of the parts in use. Greater resilience is secured than would be present if the front fender were joined to the side fenders merely, because any springing of the fender at 22 or 23 for example, in a longitudinal or lateral direction, or in fact at any point beyond the bench 7 reacts through the integral strip in a different way from the reaction if a joint were present at this point, giving a resilient support to the strip through the fastenings 24 and 25 to the front bench 7 much the way in which deflection of the sled runner acts beyond the front knees to deflect the runner between the front knee and the second knee. In other words, the combined or continuous fender acts as if it were pivoted at 24 and/or 25. The added deflection thus secured against resistance of the strip means added resilient reaction tending to bring the side and front fenders back to their normal positions.

Because the front fender is not attached to the frame except as it has attachment thereto through the fastening of the side fenders to the benches the front fender is very resilient longitudinally of the sled and to an unusual degree takes up blows at this point, spreading the front ends of the side fenders and yielding against the resilience of these side fenders. This gives opportunity not only to use the longitudinal resilience of the fender but also carefully to limit the extent to which this resilience is used by terminating the center top board at 26 at such a point that normally it shall not meet the front fender but shall act as a limiting stop for the yielding movement of the front fender.

By reason of the integral connection between the front and side fenders the entire combined fender is free resiliently to be sprung laterally, giving resilience due to the side fenders on both sides instead of that due to resilience of the side fender of one side only.

The side fender, or the front fender, whichever the part of the combined fender may be considered to be at this point, preferably lies over the steering bar protecting the steering bar against interference from above at this point.

It will be evident that the continuous fender provided greatly adds to the ultimate strength at the same time that it secures progressive resilient support to the fender parts one by another such as cannot be secured where the front fender is separate from and merely joined to the side fenders.

It will be evident that the stop may be used or may not be used as desired, depending upon whether the strength of the fender be made such that it requires ultimate limitation of the collapse of the front fender or be great enough to render this entirely unnecessary. If no stop be used, or up to the engagement of the stop by the fender where a stop is used, the resilience of the front of the sled is such that when the sled strikes an obstruction the effect of the blow upon the riders is greatly relieved by the fender. Instead of transmitting a blow abruptly to the riders a part of the blow is taken up resiliently by the sled itself.

Not only is the fender resilient to direct frontal engagement with the obstacle or the blow of another sled, for example, but the fender reacts quite desirably to diagonal engagement and to side engagement, in each case taking up in the sled part of the impact which would otherwise be taken up by the passengers or which would result in the passengers being thrown from the sled.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention what I claim as new and desire to secure by Letters Patent is:—

1. A hand sled having a resilient wooden front fender, the ends of the front fender being continued integrally to form resilient side fenders for the sled, the portion of the fender at the front at each side being curved where the side fenders and front fenders merge, whereas the resilience of the fenders causes it to yield to impact on the fender and subsequently to resume its shape.

2. A hand sled having a continuously curved resilient wooden front fender, the ends of the front fender at the sides being continued integrally and tangentially substantially to the rear of the sled to form side fenders throughout substantially the length of the sled.

3. A hand sled having a continuous fender formed of a single resilient strip of wood curved and at both ends of the curve extending toward the rear to form side fenders and a stop engagement by the front fender when it has partially collapsed to prevent excessive spring of the front fender longitudinally of the sled.

4. A hand sled having a continuous fender formed of a single resilient strip of wood curved and at both ends of the curve extending toward the rear to form side fenders and a stop engagement by the front fender when it has partially collapsed to prevent excessive spring of the front fender longitudinally of the sled, the stop comprising the end of one of the top bars of the sled.

CHARLES HERBERT MANEVAL.